UNITED STATES PATENT OFFICE.

HANS LYNCKE, OF CHARLOTTENBURG, GERMANY; SOPHIE LYNCKE HEIRESS OF SAID HANS LYNCKE, DECEASED.

PROCESS OF FORMING AN INSOLUBLE SUBSTANCE FROM THE ROOTS OF PLANTS OF THE AMORPHOPHALLUS FAMILY.

1,035,615. Specification of Letters Patent. Patented Aug. 13, 1912.

No Drawing. Application filed November 9, 1908, Serial No. 461,804. Renewed December 30, 1911. Serial No. 668,765.

*To all whom it may concern:*

Be it known that I, HANS LYNCKE, a subject of the German Emperor, and residing at Charlottenburg, near Berlin, Germany, have invented a certain new and useful Improved Process of Forming an Insoluble Material from the Roots of Plants of the *Amorphophallus* Family, of which the following is a specification.

The subject-matter of my invention is a process of forming an insoluble material from the roots of plants of the *Amorphophallus* family. In this specification the term "root-substance" means a powder obtained from the body of the root or of the root-stock of these plants by drying and grinding operations.

My process consists in treating this dry root-substance by adding it to certain solutions hereinafter specified. Said solutions may be at the atmospheric temperature and the root-substance may be left in the solutions for some hours. By this treatment a viscous mass is formed which when poured on glass plates or the like forms a continuous skin insoluble in water, which on being dried is waterproof and elastic. This skin can be used for many purposes, for example, it may be used for dressing wounds. The viscous mass is suitable for impregnating or coating textures in order to make them air-tight or waterproof.

In carrying out this process the following solutions may be used, viz., caustic alkaline solutions, such as caustic soda-lye, solutions of alkaline carbonates and of sodium acetate. Ammoniac copper, that is, a solution of copper oxid in ammonia, and also sulfate of ammoniac copper, that is ammoniac copper with the addition of sulfate of copper may also be used. The solution in which the root-substance is placed may be as concentrated as desired, the action being quicker or slower according to the degree of concentration. The solution may consist of from about 2 to 10 parts of the salts in 100 parts of water.

I claim:—

1. The hereindescribed process of forming an insoluble material from the roots of plants of the *Amorphophallus* family, which consists in treating the powdered roots with a caustic alkali, whereby a viscous mass is obtained, and in drying the mass.

2. The hereindescribed process of forming an insoluble material from the roots of plants of the *Amorphophallus* family, which consists in placing the powdered roots into a caustic soda lye and in stirring the same, whereupon a viscous mass is obtained, and in drying the viscous mass.

In testimony whereof I affix my signature in the presence of two witnesses.

HANS LYNCKE.

Witnesses:
 WOLDEMAR HAUPT,
 HENRY HASPER.